US006926168B2

(12) United States Patent
Duesterhus et al.

(10) Patent No.: US 6,926,168 B2
(45) Date of Patent: Aug. 9, 2005

(54) DISPENSING UNIT FOR DISPENSING SINGLE SHEETS

(75) Inventors: Richard Duesterhus, Paderborn (DE); Martin Landwehr, Paderborn (DE); Ulrich Nottelmann, Bad Driburg (DE); Reimund Selke, Paderborn (DE)

(73) Assignee: Wincor Nixdorf International GmbH, Paderborn (DE)

(*) Notice: Subject to any disclaimer, the term of this patent is extended or adjusted under 35 U.S.C. 154(b) by 201 days.

(21) Appl. No.: 10/466,271

(22) PCT Filed: Dec. 4, 2001

(86) PCT No.: PCT/DE01/04550

§ 371 (c)(1), (2), (4) Date: Jul. 15, 2003

(87) PCT Pub. No.: WO02/055417

PCT Pub. Date: Jul. 18, 2002

(65) Prior Publication Data

US 2004/0056411 A1 Mar. 25, 2004

(30) Foreign Application Priority Data

Jan. 15, 2001 (DE) ........................................ 101 01 565

(51) Int. Cl.[7] ................................................ B65G 59/00
(52) U.S. Cl. ..................................... 221/259; 271/10.11
(58) Field of Search ................................. 221/259, 197; 271/10.11

(56) References Cited

U.S. PATENT DOCUMENTS 4,635,922 A * 1/1987 Roetter et al. .............. 271/119
2002/0020959 A1 * 2/2002 Matsuda et al. ............ 271/122

FOREIGN PATENT DOCUMENTS

| | | |
|---|---|---|
| DE | 28 50 185 A1 | 5/1980 |
| EP | 0 950 532 A2 | 10/1999 |
| JP | 61055029 | 3/1986 |
| JP | 07053068 | 2/1995 |

* cited by examiner

*Primary Examiner*—Kenneth Noland
(74) *Attorney, Agent, or Firm*—Michaud-Duffy Group LLP

(57) ABSTRACT

In the case of a dispensing unit for dispensing individual sheets, in particular banknotes, having a box-like container for accommodating a sheet stack, which can be moved with a stack end surface in the direction of the front end wall of the container, having an accommodating module for accommodating the container, and having a withdrawal device for withdrawing individual sheets from the stack end surface through a dispensing opening of the container, the withdrawl device having a drivable withdrawal roll, which is intended for butting against the stack end surface, a transporting roll, which is arranged parallel to the withdrawal roll and can be driven in the same direction as the latter, and a counter-rotating roll, which is assigned to the transporting roll, can be driven in the opposite direction to the latter and forms a nip with the transporting roll, at least the withdrawal roll is arranged within the container.

9 Claims, 2 Drawing Sheets

DISPENSING UNIT FOR DISPENSING SINGLE SHEETS

CROSS-REFERENCE TO RELATED APPLICATIONS

This application is entitled to the benefit of and incorporates by reference essential subject matter disclosed in International Application No. PCT/DE01/04550 filed on Dec. 4, 2001 and German Patent Application No. 101 01 565.8 filed on Jan. 15, 2001.

FIELD OF THE INVENTION

The invention relates to a dispensing unit for dispensing individual sheets, in particular banknotes, having a box-like container for accommodating a sheet stack, which can be moved with a stack end surface in the direction of a front end wall of the container, having an accommodating module for accommodating the container, and having a withdrawal device for withdrawing individual sheets from the stack end surface through a dispensing opening of the container, the withdrawal device having a drivable withdrawal roll, which is intended for butting against the stack end surface, a transporting roll, which is arranged parallel to the withdrawal roll and can be driven in the same direction as the latter, and a counter-rotating roll, which is assigned to the transporting roll, can be driven in the opposite direction to the latter and forms a nip with the transporting roll.

BACKGROUND OF THE INVENTION

A dispensing unit of the type mentioned above is known, for example, from DE 28 50 185 A1. It serves, in particular, for withdrawing banknotes in an automatic teller machine.

In the case of the known dispensing unit, the withdrawal device is part of the accommodating module. When the container or the banknote cassette is pushed into the accommodating module, the action of opening a closure flap releases cutouts in the front end wall of the container, axially spaced-apart withdrawal rollers of the withdrawal roll engaging in said cutouts in order to come into contact with the stack end surface within the container. It has been found that pushing the container into the accommodating module does not always result in satisfactory contact between the withdrawal rollers and the stack end surface over the entire width of the same.

The object of the invention is to improve a dispensing unit of the type mentioned in the introduction such that satisfactory contact between the withdrawal roll and the stack end surface of the sheet stack in the container is ensured when the latter is located in the accommodating module.

SUMMARY OF THE INVENTION

This object is achieved according to the invention in that at least the withdrawal roll is arranged within the container.

In the case of the solution according to the invention, it is possible, during filling of the container with the sheets, to check the abutment of the withdrawal roll against the stack end surface and to ensure that the withdrawal roll engages over its entire length with the individual sheet forming the stack end surface. This ensures reliable withdrawal of the sheets from the sheet stack. The position of the withdrawal roll relative to the stack end surface does not change when the container is pushed into the accommodating module.

A slot which is substantially parallel to the withdrawal roll is preferably arranged in the base of the container, in the vicinity of the front end wall of the latter, such that it is aligned with a tangential plane to the withdrawal roll which is at least approximately perpendicular to the container base. The individual sheets withdrawn by the withdrawal roll are thus pushed out of the container directly through the slot. Such a slot can be covered fairly straightforwardly such that the container is closed and secured against manipulation, provided it is not inserted in the accommodating module.

It is possible, in principle, for both the counter-rotating roll and the transporting roll likewise to be arranged within the container. In a preferred embodiment, however, the counter-rotating roll is mounted in a rotatable manner on the container, beneath the container base, while the transporting roll is mounted in a rotatable manner on the accommodating module. Consequently, when the container is drawn out of the accommodating module, the nip beneath the counter-rotating roll and transporting roll is also opened up, with the result that any possible disruptions, for example caused by sheets jammed in the nip and the like, can easily be eliminated.

In order to ensure reliable separation of the sheets as they are withdrawn, the transporting roll and the counter-rotating roll may comprise, in a manner known per se, a multiplicity of rollers which are spaced apart axially, the rollers of the transporting roll and the rollers of the counter-rotating roll being offset axially in relation to one another, with the result that the rollers of one roll engage in the axial interspaces of the other roll. The sheets running through the nip are thus deformed in a slightly corrugated manner, and the friction between the transporting and counter-rotating rollers in the individual sheet is increased.

In order to improve the operations in which the sheets withdrawn by the withdrawal roll are transferred to the transporting roll and the withdrawn individual sheets are gripped by the transporting roll, through-passage slots for the rollers of the transporting roll are formed, according to the invention, in the front end wall and/or the base of the container, with the result that, when the container is pushed into the accommodating module, said rollers engage, in part, in the interior of the container. It is thus possible for an individual sheet displaced by the withdrawal roll in the direction of the slot in the base of the container to be gripped by the transporting roll when it is still in the container interior, and pushed reliably out of the container.

The withdrawal roll expediently also has a plurality of axially spaced-apart rollers, the rollers of the withdrawal roll and the rollers of the transporting roll each engaging in the axial interspaces of the respectively other roll.

In order to ensure uniform abutment pressure between the stack end surface and the withdrawal roll despite the withdrawal of the individual sheets, a pressure-exerting device is provided in the container in a manner known per se in order to advance the sheet stack in the direction of the front end wall and thus in the direction of the withdrawal roll.

On their circumferential surface, the withdrawal rollers may have carry-along teeth or ribs directed parallel to the axis, in order for the friction fit between the withdrawal rollers and the respective individual sheet to be enhanced.

BRIEF DESCRIPTION OF THE DRAWINGS

The following description explains the invention, with reference to an exemplary embodiment, in conjunction with the attached drawings, in which.

DETAILED DESCRIPTION OF THE PREFERRED EMBODIMENTS

Figure 1:
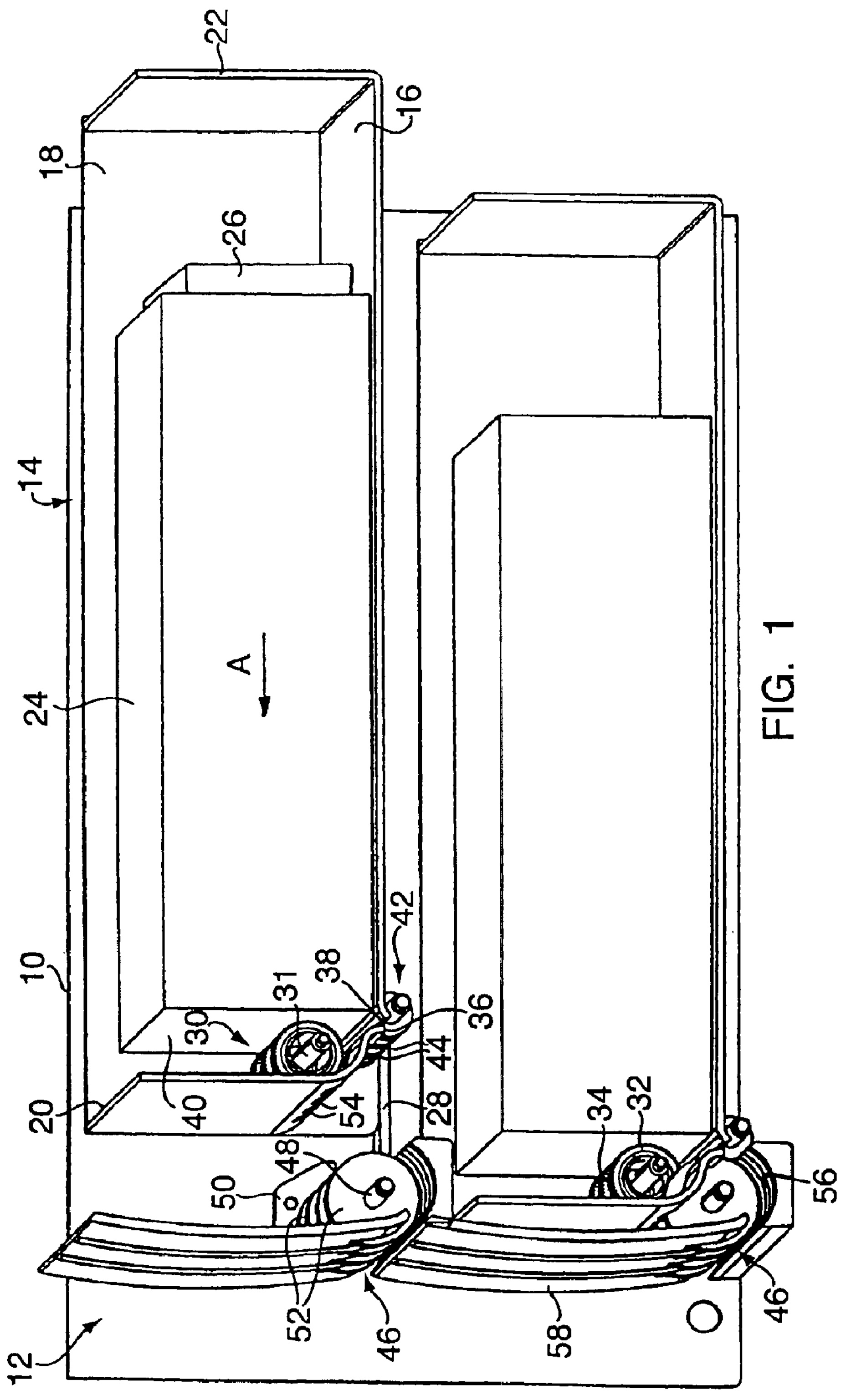
FIG. 1 shows a schematic partially cut-away view through two dispensing units according to the present invention located one above the other, the respective container in one unit having been pushed part of the way into the respective accommodating module and in the other unit having been pushed all the way into the respective accommodating module.

FIG. 1 shows two dispensing units which are arranged one above the other, are intended for dispensing individual sheets and, on their own or together with further units, may be part of a machine for dispensing banknotes. 10 designates a wall of a frame which forms two accommodating modules 12 arranged one above the other. A cuboidal or box-like container 14 may be pushed into each of these accommodating modules 12, the container having a base 16, side walls 18, a front end wall 20 and a rear end wall 22 and also a cover (not illustrated). The container 14 serves for accommodating a sheet stack 24 which is formed from individual sheets and is prestressed, in the direction of the arrow A, toward the front end wall 20 of the container 14 by a pressure-exerting device 26. Schematically indicated slide rails 28 are intended for guiding the container 14 in the respective accommodating module 12.

Arranged in the vicinity of the front end wall 20 and the container base 16 is a withdrawal roll 30 which is mounted in a rotatable manner in the side walls 18 by way of its shaft 31, which is directed parallel to the front end wall 20, and can be coupled to a drive device (not illustrated) with respect to the accommodating module 12. The withdrawal roll 30 comprises a plurality of withdrawal rollers 32 which are spaced apart axially, with the result that there is an interspace 34 between each of the rollers.

The front end wall 20, in its bottom region, is curved around the withdrawal roll 30 and forms, with its bottom border 36, one boundary of an outlet slot 38, which extends over the width of the container 14 and is arranged in the base 16 of the container 14 such that it is aligned at least more or less with a tangential surface to the withdrawal roll 30 which is perpendicular to the base 16, that is to say with the stack end surface 40 of the sheet stack 24.

Beneath the base 16 of the container 14, in the vicinity of the outlet slot 38, a counter-rotating roll 42 is mounted in a rotatable manner between the side walls 18 of the container 14, this roll likewise comprising a plurality of axially spaced-apart rollers 44 and, like the withdrawal roll 30, being capable of being coupled to a drive (not illustrated) of the respective accommodating module 12 when the container 14 has been pushed all the way into the accommodating module 12. This counter-rotating roll 42 is assigned a transporting roll 46, which is mounted in a rotatable manner on a module-mounted frame 50 by way of its shaft 48, which is parallel to the shaft 31 of the withdrawal roll 30, and is connected to a drive (not illustrated). The drive expediently comprises a single motor and a suitable gear mechanism for driving all three rolls, that is to say the withdrawal roll, the transporting roll and the counter-rotating roll, the drive being designed such that the transporting roll 46 and the withdrawal 30 are driven in the same direction, while the counter-rotating roll 42 is driven in the opposite direction of rotation.

Figure 2:
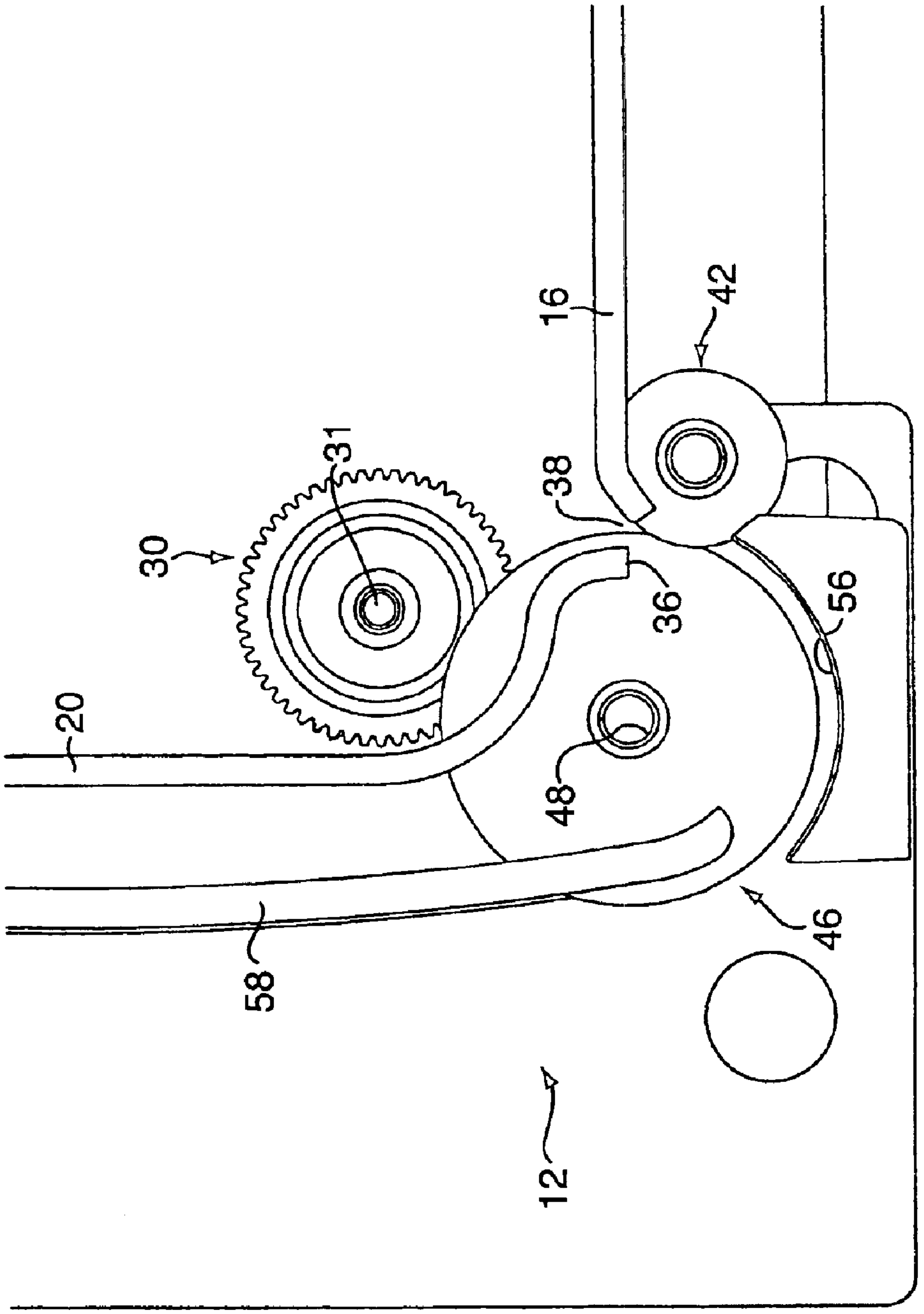
FIG. 2 shows a schematic end view of the withdrawal device of a dispensing unit according to the invention.

The transporting roll 46, like the withdrawal roll 30 and the counter-rotating roll 42, comprises a plurality of individual, axially spaced-apart rollers 52, the rollers 52 of the transporting roll 46 and the rollers 34 of the withdrawal roll 30 and also the rollers 44 of the counter-rotating roll 42 being offset axially in relation to one another such that the rollers of the withdrawal roll 30 and of the counter-rotating roll 42 each engage in the interspaces between the rollers 52 of the transporting roll 46 when the container 14 has been pushed all the way into the respective accommodating module 12, as is shown in FIG. 2.

Slots 54 are formed in the bottom section of the front end wall 20, which is curved around the withdrawal roll 30, the rollers 52 of the transporting roll 46 engaging in said slots when the container 14 has been pushed all the way into the respective accommodating module 12, with the result that an individual sheet displaced by the withdrawal roll 30 can be gripped by the transporting roll 46 when it is still within the container 14.

Located beneath the respective transporting roll 46 is a first directing surface 56, which is curved in the form of a circle arc around the transporting roll 46 and, when the container 14 has been pushed all the way in, adjoins the outlet slot 38 in the container base 16. This directing surface 56 directs the withdrawn individual sheets to a directing plate 58, which is a respective part of the transporting path for the individual sheets which runs along all the dispensing units and by means of which individual sheets dispensed from the dispensing units are transported to a dispensing location of the automatic teller machine.

It can be seen that the contact between the stack end surface 40 and the withdrawal roll 30 is always maintained irrespective of whether the container 14 has been pushed into the accommodating module 12 or not. Since the withdrawal roll 30 is already located within the container 14, there is no need to provide any openings through which the rollers of the withdrawal roll can engage in the interior of the container. The slots 54 in the front end wall 20 for the rollers 52 of the transporting roll 46 may, if appropriate, also be dispensed with if the security of the container is to be increased as a result. The through-passage gap 38 may be made so narrow that the unauthorized removal of individual sheets from the container through the through-passage gap 38 is made extremely difficult. The gap may be covered straightforwardly with only a small number of moving parts and with a small closure distance for the moving parts. The dispensing unit according to the invention is of considerably simpler construction and less susceptible to malfunctioning than known dispensing units.

What is claimed is:

1. A dispensing unit for dispensing individual sheets, in particular banknotes, comprising: a box-like container for accommodating a sheet stack, which can be moved with a stack end surface in the direction of a front end wall of the container, an accommodating module for accommodating the container, a withdrawal device for withdrawing individual sheets from the stack end surface through a dispensing opening of the container, the withdrawal device having a drivable withdrawal roll, which is intended for butting against the stack end surface, a transporting roll, which is substantially parallel to the withdrawal roll and can be driven in the same direction as the latter, and a counter-rotating roll, which communicates with the transporting roll and can be driven in the opposite direction to the latter and forms a nip with the transporting roll, and wherein at least the withdrawal roll is arranged within the container.

2. The dispensing unit as defined by claim 1, further comprising a slot which is substantially parallel to the withdrawal roll is arranged in a base of the container, in the vicinity of the front end wall of the container, such that it is aligned with a substantially tangential plane to the withdrawal roll which is at least approximately perpendicular to the container base.

3. The dispensing unit as defined by claim 1, wherein the counter-rotating roll is mounted in a rotatable manner on the container, beneath a base defined by the container.

4. The dispensing unit as defined by claim 1, wherein the transporting roll is mounted in a rotatable manner on the accommodating module.

5. The dispensing unit as defined by claim 1, wherein the transporting roll and the counter-rotating roll comprise a multiplicity of rollers which are spaced apart axially, the rollers of the transporting roll and the rollers of the counter-rotating roll being offset axially in relation to one another, with the result that the rollers of one roll engage in the axial interspaces of the other roll.

6. The dispensing unit as defined by claim 5, further comprising through-passage slots for the rollers of the transporting roll are formed in the front end wall and/or the base of the container.

7. The dispensing unit as defined by claim 6, wherein the withdrawal roll comprises a plurality of axially spaced-apart rollers, the rollers of the withdrawal roll and the rollers of the transporting roll each engaging in the axial interspaces of the respectively other roll.

8. The dispensing unit as defined by claim 1, wherein provided in the container is a pressure exerting device for advancing the sheet stack in the direction of the front end wall.

9. The dispensing unit as defined by claim 7, wherein on their circumference surface, the withdrawal rollers have carry-along teeth or ribs directed parallel to the axis.

* * * * *